United States Patent [19]

Obara

[11] Patent Number: 4,507,580
[45] Date of Patent: Mar. 26, 1985

[54] INSULATION INSERT ASSEMBLY AND METHOD FOR MANUFACTURING THE SAME

[75] Inventor: Ken Obara, Fuji, Japan

[73] Assignee: Tokyo Shibaura Denki Kabushiki Kaisha, Kawasaki, Japan

[21] Appl. No.: 497,681

[22] Filed: May 24, 1983

[30] Foreign Application Priority Data

Jun. 18, 1982 [JP] Japan ................. 57-105112

[51] Int. Cl.³ ............................................. H02K 3/48
[52] U.S. Cl. ..................................... 310/214; 310/43; 310/45; 310/260; 29/596; 428/157; 428/172
[58] Field of Search ............. 310/194, 215, 214, 260, 310/42, 43, 45; 336/185, 208; 29/596; 428/157, 172; 156/256

[56] References Cited

U.S. PATENT DOCUMENTS

| 3,857,171 | 12/1974 | Lund | 29/596 |
|---|---|---|---|
| 3,885,288 | 5/1975 | Lund | 29/596 |
| 4,263,475 | 4/1981 | McNeal | 310/215 |
| 4,335,325 | 6/1982 | Miller | 310/214 |
| 4,349,956 | 9/1982 | Koenig | 29/596 |
| 4,389,584 | 6/1983 | Burns | 310/43 |

FOREIGN PATENT DOCUMENTS

| 114003 | 10/1974 | Japan | 310/194 |
|---|---|---|---|
| 27006 | 3/1975 | Japan | 310/194 |

Primary Examiner—R. Skudy
Attorney, Agent, or Firm—Cushman, Darby & Cushman

[57] ABSTRACT

An insulation insert assembly has first and second substantially rectangular insulation sheets, and a pair of connection rods for connecting the sheets. The first and second sheets are arranged on the same plane directly opposing each other and have mutually facing parallel lateral edges at a prescribed distance. The second insulation sheet has a protrusion projecting from the lateral edge toward the first insulation sheet. The first and second insulation sheets are designed to be inserted between main and auxiliary coils, which are fitted to a stator core, to effect insulation between the coils. The connection rods are designed to be inserted into slots of the stator core. The protrusion is set between the rods and prevents a gap from being produced between the second insulation sheet and the stator core which might result from the lifting of the second sheet from the stator core.

5 Claims, 9 Drawing Figures

INSULATION INSERT ASSEMBLY AND METHOD FOR MANUFACTURING THE SAME

BACKGROUND OF THE INVENTION

This invention relates to an insulation insert assembly set between the main and auxiliary coils of a stator of, for example, an electric motor to effect insulation between the coils. This invention further relates to a method for manufacturing the insulation insert assembly.

A 2-phase motor, for example, is provided with a stator core and main and auxiliary coils wound about the stator core. An insulation insert assembly is generally put between the main and auxiliary coils to insulate both coils from each other. This insulation insert assembly generally includes a pair of insulation sheets prepared from, for example, polyester films and monofilaments and a pair of narrow connection rods for connecting said paired sheets, which are prepared from, for example, monofilaments. The sheets are substantially rectangular and are arranged in parallel spaced apart to an extent corresponding to the thickness of the stator core.

The stator is constructed in the following manner. A main coil is fitted to a stator core with the respective turns of the main coil inserted into the corresponding slots of the stator core. Next, the insulation insert assembly is securely attached to the stator core with the connection rods of the insulation insert assembly fitted into the corresponding slots of the stator core. The paired insulation sheets are set on both sides of the stator core. The fitting of the insulation insert assembly is effected by an automatic insertion device. Later the turns of the auxiliary coil are inserted into the corresponding slots of the stator core, thereby causing the paired sheets of the insulation insert assembly to be set between the main and auxiliary coils. When the auxiliary coil is inserted into the stator core slots, the central portion of the sheet located on the upper side of the stator core is pushed upward by the auxiliary coil. In this case, a gap is produced between this sheet and the stator core, thereby failing to assure complete insulation between the main and auxiliary coils.

To resolve the above-mentioned problem, the conventional insulation insert assembly is designed to suppress the lifting of the central portion of the respective sheets by reducing an interval defined between the paired connection rods. When, however, the connection rods are spaced from each other at a small distance, it is impossible to accurately locate both end parts of the respective sheets, because those relatively broader portions of the respective sheets which lie outside of the connection rods tend to be more freely bent. The above-mentioned drawback leads to a decline in the insulation efficiency of the insulation insert assembly. The Japanese patent disclosure No. 50-27006 sets forth an insulation insert assembly provided with three connection rods. This proposed insulation insert assembly suppresses the lifting of the paired sheets when the auxiliary coil is fitted into the slots of the stator core, and assures the accurate location of both end portions of the respective sheets. However, this proposed insulation insert assembly is still accompanied with the drawbacks that since three connection rods are provided, the proposed insulation insert assembly involves a large number of parts, raising the manufacturing cost and presenting difficulties in inserting the three connection rods into the corresponding slots of the stator core.

SUMMARY OF THE INVENTION

This invention has been accomplished in view of the above-mentioned circumstances, and is intended to provide an inexpensive insulation insert assembly which assures complete insulation between coils of a stator and can be easily fitted into a stator core, and also a method of manufacturing the insulation insert assembly.

To attain the above-mentioned objects. This invention provides an insulation insert assembly which comprises first and second insulation sheets arranged on the same plane directly opposing each other and a pair of connection rods for connecting both sheets. The first sheet is made substantially rectangular, and one lateral edge is substantially linear. The second sheet is substantially rectangular and has a substantially linear lateral edge which is spaced from the lateral edge of the first sheet at a distance substantially equal to the thickness of a stator core and arranged parallel with the lateral edge of the first sheet. The groups of the first and second sheets are respectively mounted on the upper and lower planes of the stator core between the first and second coils fitted to the stator core in a state connected by a pair of connection rods, thereby effecting insulation between the first and second coils. The connection rods are inserted into the corresponding slots of the stator core in a state spaced from each other at a prescribed distance. The second sheet has a protrusion which projects from the lateral edge of said second sheet toward the first sheet in a state lying between both connection rods. This protrusion reduces unsatisfactory insulation of the subject insulation insert assembly which might result from the lifting of the second sheet from the stator core. When the second coil is inserted into the stator core and the second sheet of the insulation insert assembly already put into the stator core is lifted from the stator core by the insertion of the second coil, no gap is produced between the second sheet and stator core, because the second sheet is provided with the aforementioned protrusion. Therefore, the subject insulation insert assembly reliably effects complete insulation between the first and second coils. Further, since the second sheet has the protrusion, it is unnecessary to prevent the lifting of the second sheet by narrowing the interval of the connection rods as practised in the past. As a result, it is possible to broadly space the connection rods from each other and to accurately locate the end portions of the respective sheets. For the reason given above, the insulation insert of the invention has the advantages that insulation between the first and second coils can be reliably effected without providing any other connection rods, and the insulation insert assembly can be manufactured at low cost without increasing the number of parts and can be easily fitted to the stator core.

To attain the above-mentioned object, the method of manufacturing the subject insulation insert assembly comprises the steps of:

arranging in parallel a first band-shaped insulation sheet material having a prescribed width and a second band-shaped insulation sheet material having a prescribed width in a state spaced from each other at a smaller distance than the thickness of a stator core; punching the second insulation sheet material to provide a pair of depressions spaced from each other at a prescribed distance with a specified depth, thereby forming a protrusion projecting toward the first band-shaped insulation sheet material; connecting the first and second insulation sheet materials by a pair of connection rods which are passed over the depressions of the second insulation sheet at one end portion and also into those portions of the first insulation sheet which face the depressions at the other end portion; and, when groups of first and second insulation sheets are produced by a continuous process, separating the groups from each other by cutting off the junctions thereof outside of the paired connection rods of the respective groups.

DETAILED DESCRIPTION OF THE PREFERRED EMBODIMENT

Figure 1:
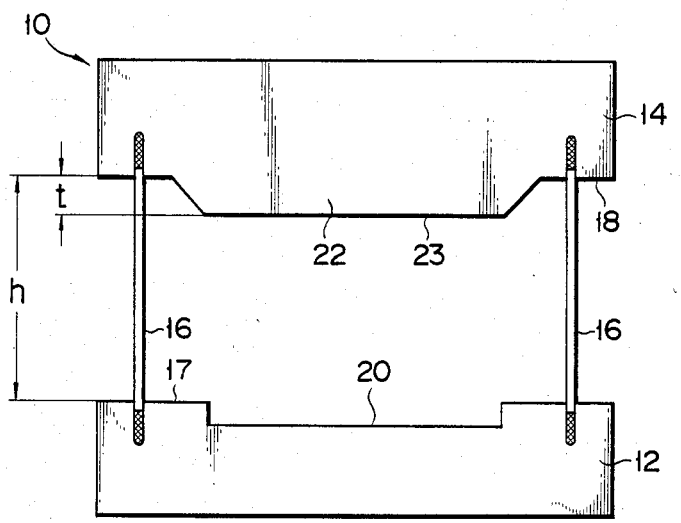
FIG. 1 is a plan view of an insulation insert assembly embodying this invention.

Description will now be given with reference to the accompanying drawings of an insulation insert assembly embodying this invention. As seen from FIG. 1, an insulation insert assembly 10 comprises first and second substantially rectangular insulation sheets 12, 14 and a pair of connection rods 16 for connecting the first and second insulation sheets. Each sheet is prepared from, for example, polyester films with a thickness of about 0.2 mm. The sheets 12, 14 are arranged on the same plane directly opposing each other and have mutually facing parallel lateral edges 17, 18. The sheets 12, 14 are connected by the connection rods 16 in a state spaced from each other at a distance h. This distance h is chosen to be substantially equal to the thickness of a stator to which the insulation sheet assembly 10 is fitted. The first sheet 12 has a depression 20 which extends along the lateral edge 17 and is positioned between the connection rods 16. The second sheet 14 has a protrusion 22 projecting from the lateral edge 18 toward the first sheet 12 with a height t. The protrusion 22 is also set between the connection rods 16. The protrusion 22 has an edge 23 parallel with the lateral edge 18 of the second sheet 14, and extends substantially through a region defined between the connection rods 16.

The connection rod 16 is prepared by, for example, forming monofilaments into a round column having a diameter of about 0.9 mm. The connection rods 16 are welded at one end to the first sheet 12 and at the other end to the second sheets 14, for example, by ultrasonic welding at right angles to the lateral edges 17, 18 of the first and second sheets 12, 14.

Figure 2:
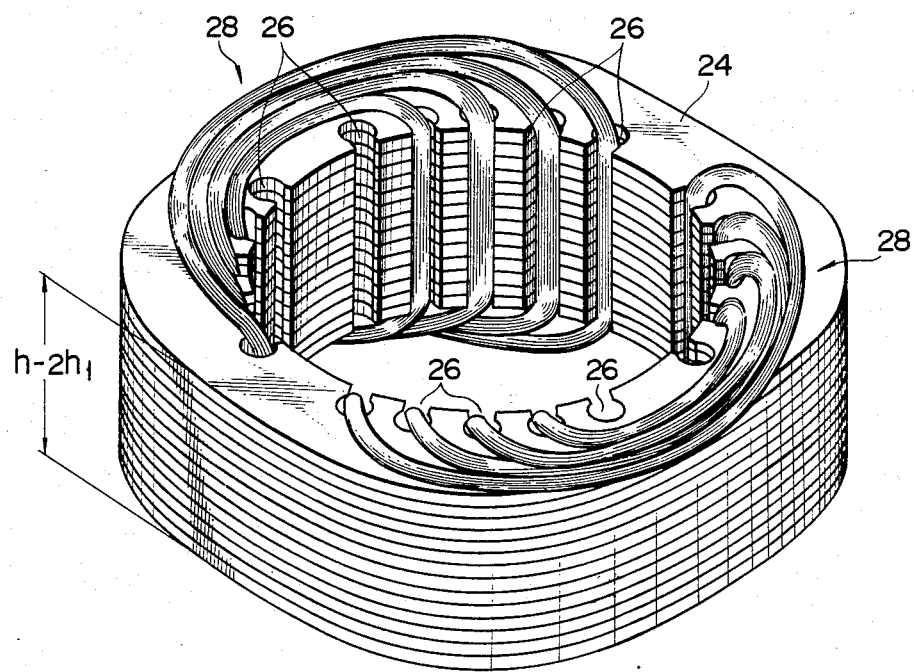
FIGS. 2 to 4 are perspective views showing the steps of assembling a stator provided with the insulation insert assembly of FIG. 1.

Description will now be given with reference to FIGS. 2 to 4 of the steps of assembling a stator provided with the above-mentioned insulation insert assembly 10. Referring to FIG. 2, the respective turns of a first coil assembly consisting of a pair of main coils 28 are fitted into a large number of slots 26 of a substantially annular stator core. As seen from FIG. 5, an elongate substantially rectangular insulation sheet 30 is inserted into each slot 26. The insulation sheet 30 is bent outward at both ends. Both end portions of the insulation sheet 30 project outward to a height $h_1$ from the top and bottom planes of the stator core 24. The stator core 24 has a thickness which is chosen to be $h-2h_1$.

Figure 3:
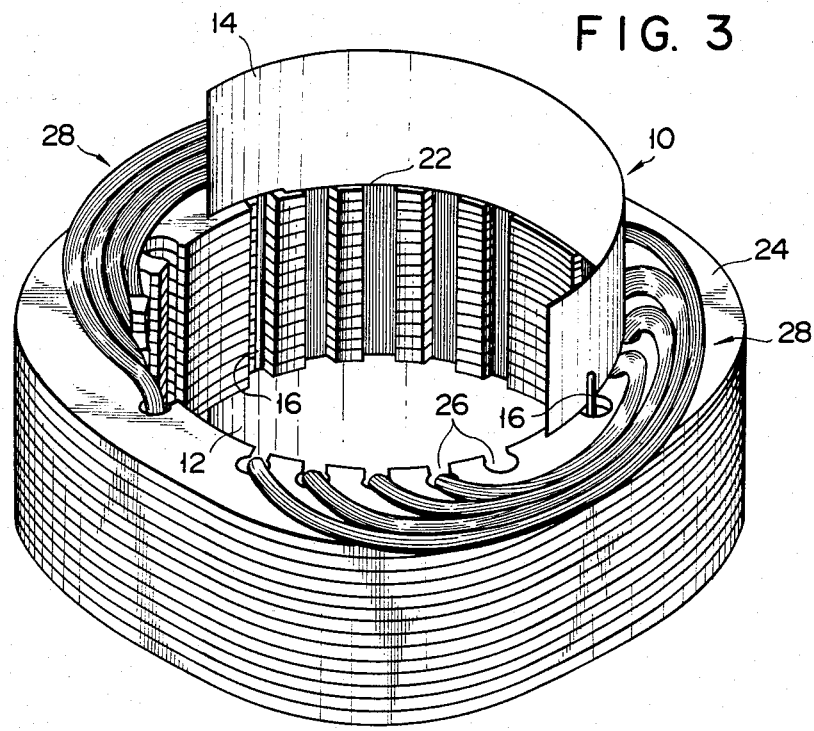

As shown in FIG. 3, the insulation insert assembly 10 is securely fitted into the stator core 24 by an automatic insertion device (not shown) due to the connection rod 16 being inserted, as best shown in FIG. 3, into the corresponding vacant slot 26 into which a turn of the main coil 28 is not fitted. The second sheet 14 is set on the upper side of the stator core 24, and the first sheet 12 is set on the lower side thereof. The lateral edges 17, 18 of the first and second sheets 12, 14, which are spaced from each other at a distance h, are in contact with the corresponding sides of the stator core 24. In this case, the protrusion 22 is bent in an arc. Though omitted for briefness of representation, another insulation insert assembly is fitted to the side of the stator core 24 opposite to that indicated in FIGS. 2 to 4 in the symmetric form with the illustrated insert assembly 10.

Figure 4:
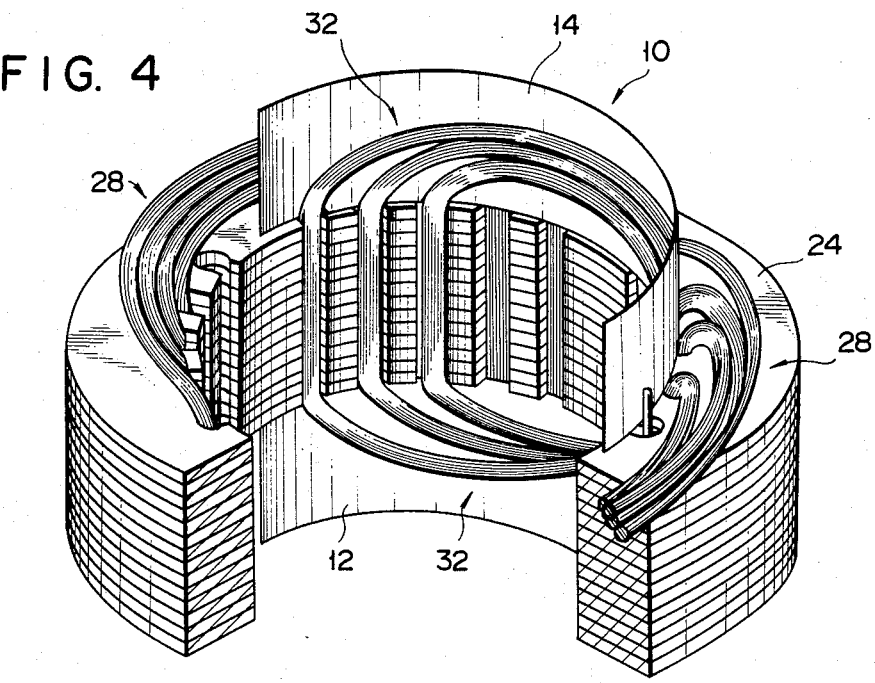
Figure 5:
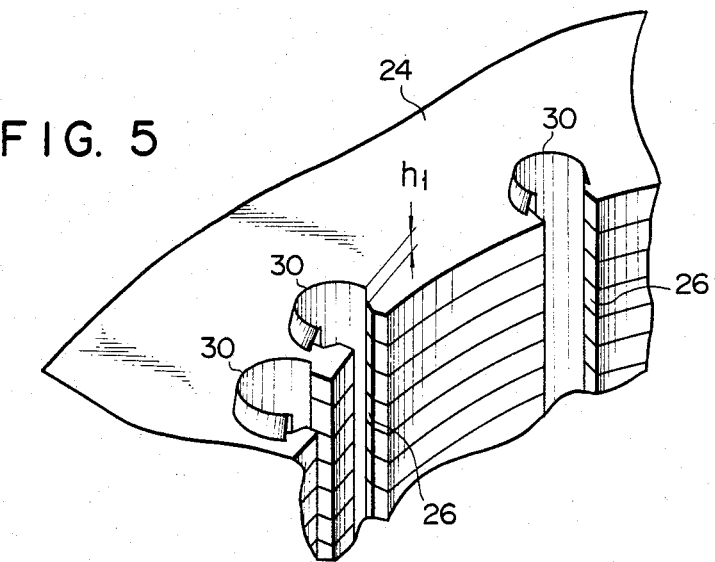
FIG. 5 is an enlarged perspective view of part of a stator core.

Later as shown in FIG. 4, the turns of one of paired second or auxiliary coils 32 are fitted into the slots 26. The auxiliary coil 32 is set in place in a state circumferentially rotated about 90 degrees from the main coil 28. As a result, the second sheet 14 is placed between those parts of the main coil 28 and auxiliary coil 32 which are located on the upper side of the stator core 24. The first sheet 12 is set between those parts of the main and auxiliary coils which are located on the underside of the stator core 24.

The first and second sheets 12, 14 carry out insulation between the main coil 28 and auxiliary coil 32. Further, an elongate substantially rectangular sheet (not shown) is inserted between the turns of the main coil 28 and those of the auxiliary coil 32 fitted into the respective slots 26. The turns of the auxiliary coil 32 are inserted into the slots 26 from below the stator core 24. When the auxiliary coil 32 is inserted, the second sheet 14 is lifted by the auxiliary coil. As a result, the protrusion 22 of the second sheet 14 which has been bent in the arc is stretched straight forward, causing the edge 23 of the protrusion 22 to be in contact with the stator core 24.

The second insulation 14 of the insulation insert assembly 10 constructed as described above has the protrusion 22 projecting from the lateral edge 18 of the second sheet 14 toward the first sheet 12. Even when, therefore, the second insulation sheet 14 is lifted by the fitting of the auxiliary coil 32, the protrusion 22 of the second sheet 14 prevents a gap from being produced between the second sheet 14 and stator core 24, thereby assuring reliable insulation between the main coil 28 and auxiliary coil 32, because current is prevented from being conducted through a gap which might otherwise occur between said second sheet 14 and stator core 24. The present applicant studied how insulation between the main coil 28 and auxiliary coil 32 was affected by the presence and absence of the aforementioned protrusion 22 of the second sheet 14. As a result, it has been disclosed that when the second insulation sheet 14 destitute of the protrusion 22 was applied, insulation failed, whereas, when the second sheet 14 provided with a protrusion having a height of about 3 mm was used, no failure in insulation occurred. Moreover because it is unnecessary to reduce the distance between the paired connection rods 16, as practised in the past, in order to suppress the lifting of the second insulation sheet 14, the paired connection rods 16 can be spaced from each other at a broader distance. Therefore, the displacement of the respective right and left end portions of the first and second sheets 12, 14 can be reliably prevented and with an improvement on the insulation efficiency is improved. The connection rods can be inserted into the corresponding vacant slots of the stator core 24, thereby facilitating the fitting of the insulation insert assembly 10 and the insertion of the turns of the auxiliary coil 32 into the slots 26. Further, since there is no need to prevent the lifting of the second sheet by providing any more connection rod, the insulation insert assembly can be manufactured at relatively low cost.

Figure 6:
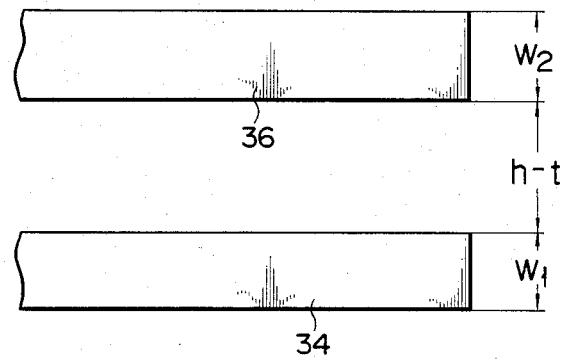
FIGS. 6 to 9 are plan views showing the steps of manufacturing the insulation insert assembly by the method of the invention.
Figure 7:
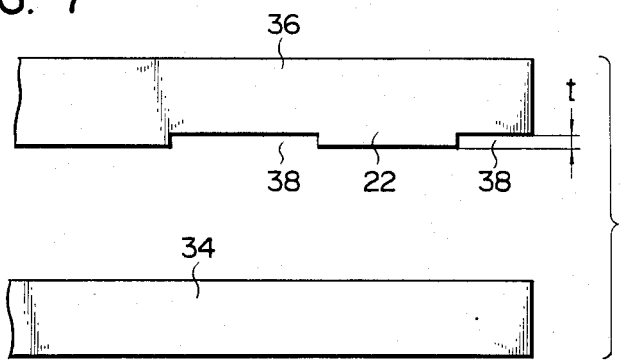
Figure 8:
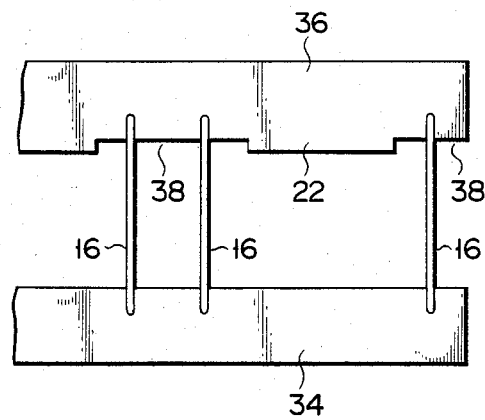
Figure 9:
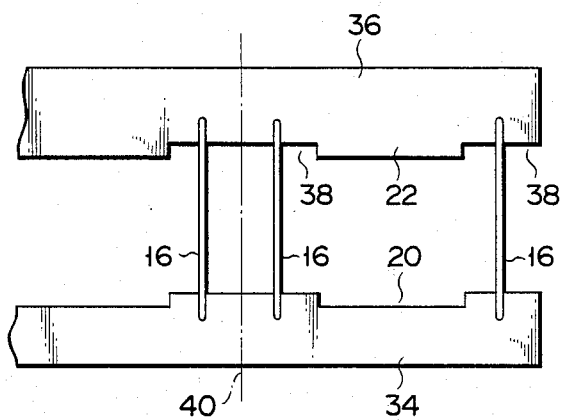

Description will now be given with reference to FIGS. 6 to 9 of the steps of manufacturing the insulation insert assembly 10 embodying this invention. Referring to FIG. 6, first and second insulation sheet materials 34, 36 are provided to fabricate first and second sheets 12, 14. The first and second insulation sheet materials 34, 36 are band-shaped materials having widths $W_1$, $W_2$. According to this invention, $W_2$ is chosen to be broader than $W_1$ to an extent corresponding to the height t of the protrusion 22 of the second sheet 14. The insulation sheet materials 34, 36 are provided in parallel in a state spaced from each other at a distance shorter than the thickness of the stator core 24 by the height of the protrusion 22 of the second insulation sheet 14. The second sheet material 36 is punched in the form shown in FIG. 7 to produce a pair of depressions 38 with a depth t in a state spaced from each other at a prescribed distance. As a result, a protrusion 22 having a height t is provided between the depressions 38. Thereafter, as shown in FIG. 8, a pair of connection rods 16 are ultrasonically welded to the first and second sheet materials 34, 36 respectively for their mutual connection. The paired rods 16 are spatially set in each depression 38 in parallel at right angles to the sheet materials 34, 36. The first sheet 34 is also punched to provide a depression 20 (FIG. 9) between the connection rods 16. The depression 20 is provided for the automatic insertion device (not shown) and, therefore, it may be dispensed with where this insertion device is not used. The first and second sheet materials 34, 36 are respectively cut off along a one dot-dash line 40 (FIG. 9), which extends through the depression 38 outside of the paired connection rods 16 in parallel therewith. The above-mentioned steps completes the manufacture of the subject insulation insert assembly.

According to the manufacturing method of this invention, the connection rods 16 are welded to the punched second insulation sheet 36, and thereafter the first sheet 34 is punched. Compared with the conventional process of simultaneously punching the first and second sheet materials 34, 36 before fitting the connection rods 16 thereto, the manufacturing method of this invention reduces the displacement of the first and second sheet materials during punching, thereby assuring the accurate location of the connection rods 16 and improvement in the quality of the manufactured insulation insert assembly.

What is claimed is:

1. An insulation insert assembly for effecting insulation between first and second coils of a stator core having the turns of the coils inserted into stator core slots, said inserts comprising:

a first substantially rectangular insulation sheet having one substantially linear lateral edge insertable between those parts of the first and second coils which are positioned on one side of the stator core, thus effecting insulation between the first and second coils;

a second substantially rectangular insulation sheet 12 disposed in the same plane as the first insulation sheet to directly oppose the same, said second insulation sheet having a lateral edge parallel to the lateral edge of the first insulation sheet and separated therefrom by a distance substantially equal to the thickness of the stator core, and a protrusion projecting from the lateral edge of the second insulation sheet toward the first insulation sheet and insertable between those parts of the first and second coils which are positioned on the other side of the stator core, thus effecting insulation between the first and second coils; and a pair of spatially arranged connection rods registrable with respective ones of the stator core slots for connecting and separating the first and second sheets, said first insulation sheet having a depression which extends along the lateral edge of said first insulation sheet and is positioned between the connection rods and wherein said protrusion is positioned between the connection rods to prevent a gap from forming between the second insulation sheet and the stator core which might result from the lifting of the second insulation sheet from the stator core.

2. The insulation insert assembly according to claim 1, wherein the protrusion has a projecting edge parallel with the lateral edge of the second insulation sheet and extends substantially through a region defined between the connection rods.

3. The insulation insert assembly according to claim 1, wherein the connection rods are fitted at right angles to the lateral edges of the first and second insulation sheets.

4. The insulation insert assembly according to claim 1, wherein the first and second insulation sheets are prepared from a polyester film; and the connection rods are prepared from a monofilament.

5. An insulation insert assembly to provide insulation between end turns of primary and auxiliary coils inserted into slots of a stator core, said insert comprising:

first and second substantially planar and substantially rectangular insulation sheets each defining a linear lateral edge, and at least one pair of connector rod means fixed to said first and second insulation sheets to mount said first and second insulation sheets in opposing coplanar relationship so that said lateral edges thereof are substantially parallel to one another, said connector rod means separating said first and second insulating sheets to define therebetween a dimension substantially equal to the thickness of the stator core, and said connector rod means registrable with respective stator core slots to position said first and second insulation sheets between end turns of the primary and auxiliary coils at respective ends of the stator thus providing insulation between the primary and auxiliary coils; wherein one insulation sheet of said first or second insulation sheets includes means for preventing a gap from forming between said one insulation sheet and a respective end of said stator core due to the upward displacement of said one sheet in response to insertion of said auxiliary coils in respective stator core slots, said gap-preventing means including means defining a protruding portion formed on said one insulation sheet between said separated connector rod means and projecting from the lateral edge of said one insulation sheet towards the other of said first or second insulation sheets, said protruding portion defining a terminal edge substantially parallel to said lateral edges, the other insulation sheet of said first and second insulation sheets includes a depression which extends along the lateral edge of said other insulation sheet and is positioned between said pair of connector rod means and wherein said protruding portion defining means for being arcuately flexed when said first and second insulation sheets are positioned adjacent said respective stator core ends and thereafter for assuming a coplanar relationship with said first the second insulation sheets when said auxiliary coils are inserted into said stator core slots and to responsively upwardly displace said one insulation sheet so that said terminal edge bears against said respective stator core end whereby a gap between said one insulation sheet and said respective stator core end is prevented.

* * * * *